United States Patent
Sun et al.

(10) Patent No.: US 9,542,970 B2
(45) Date of Patent: Jan. 10, 2017

(54) LIGHT INTERFERENCE MODULE AND HOLOGRAPHIC STORAGE APPARATUS

(71) Applicant: National Central University, Taoyuan (TW)

(72) Inventors: Ching-Cherng Sun, Taoyuan (TW); Yeh-Wei Yu, Taoyuan (TW); Che-Chu Lin, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 14/880,285

(22) Filed: Oct. 12, 2015

(65) Prior Publication Data

US 2016/0225399 A1    Aug. 4, 2016

Related U.S. Application Data

(60) Provisional application No. 62/109,632, filed on Jan. 30, 2015.

(30) Foreign Application Priority Data

Jun. 1, 2015    (TW) .............................. 104117665 A

(51) Int. Cl.
  *G11B 7/00*    (2006.01)
  *G11B 7/1353*    (2012.01)

(52) U.S. Cl.
  CPC .................................. *G11B 7/1353* (2013.01)

(58) Field of Classification Search
  CPC ..... G11B 7/0065; G11B 7/083; G11B 7/1374; G03H 1/26; G02B 5/32
  USPC ..... 369/103, 112.23; 359/15, 22, 24, 21, 28, 359/32

See application file for complete search history.

(56) References Cited

U.S. PATENT DOCUMENTS

| | | | | |
|---|---|---|---|---|
| 7,193,757 B2 * | 3/2007 | Chen | .................... | G11B 7/1362 359/24 |
| 7,724,409 B2 * | 5/2010 | Lin | ..................... | G11B 7/0065 359/22 |
| 7,821,898 B2 | 10/2010 | Allen et al. | | |
| 7,986,603 B1 | 7/2011 | Trisnadi et al. | | |
| 2005/0270610 A1 | 12/2005 | Moon | | |
| 2008/0088898 A1 | 4/2008 | Szarvas et al. | | |
| 2013/0128714 A1 | 5/2013 | Nakamura et al. | | |

(Continued)

FOREIGN PATENT DOCUMENTS

| | | |
|---|---|---|
| CN | 10172795 A | 6/2010 |
| CN | 101946333 A | 1/2011 |

(Continued)

*Primary Examiner* — Nabil Hindi
(74) *Attorney, Agent, or Firm* — CKC & Partners Co., Ltd.

(57) ABSTRACT

A light interference module includes an object lens, a first light-guiding element, and a second light-guiding element. The object lens is configured to project a signal light beam to an optical storage media. The first light-guiding element is configured to project a first reference light beam to the optical storage media, in which the first reference light beam and the signal light beam produce a first interference pattern on the optical storage media. The second light-guiding element is configured to project a second reference light beam to the optical storage media, in which the second reference light beam and the signal light beam produce a second interference pattern on the optical storage media, and the first interference pattern is different from the second interference pattern.

18 Claims, 7 Drawing Sheets

(56) References Cited

U.S. PATENT DOCUMENTS

2014/0267597 A1\* 9/2014 Yu .................. G03H 1/0443
　　　　　　　　　　　　　　　　　348/40
2015/0062675 A1\* 3/2015 Ayres ................ G03H 1/265
　　　　　　　　　　　　　　　　　359/22

FOREIGN PATENT DOCUMENTS

| CN | 101763019 B | 11/2011 |
| JP | 2006343714 A | 12/2006 |
| KR | 101084091 B1 | 11/2011 |
| TW | 201013660 | 4/2010 |
| TW | I351692 | 11/2011 |
| TW | I384474 | 2/2013 |

\* cited by examiner

LIGHT INTERFERENCE MODULE AND HOLOGRAPHIC STORAGE APPARATUS

CROSS-REFERENCE TO RELATED APPLICATION

This application claims the priority benefit of U.S. provisional application No. 62/109,632, filed on Jan. 30, 2015, and Taiwanese application No. 104117665, filed on Jun. 1, 2015. The entirety of the above-mentioned patent applications are hereby incorporated by reference herein and made a part of specification.

BACKGROUND

Technical Field

The present disclosure relates to a light interference module and a holographic storage apparatus using the same.

Description of Related Art

With the development of technology, the amount of storage capacity required for electronic files has correspondingly increased. The typical method of data storage involves recording magnetic or optical changes on the surface of a recording medium, and the magnetic or optical changes are taken as the basis of the data. Examples of such recording mediums include floppy disks and compact discs. However, with the continued increase in the amount of storage capacity required for electronic files, the development of holographic storage technology has been attracting the attention of those in the field.

With holographic storage technology, image data can be written into a recording medium (a photosensitive medium) via interference between a signal light beam and a reference light beam. When the image data is read, the image data can be generated by emitting the reference light beam into the recording medium (photosensitive medium) again, and a detector may read the generated image data. In other words, the storage capacity of the holographic storage technology is related to the signal light beam and the reference light beam.

SUMMARY

An aspect of the present disclosure provides a holographic storage apparatus configured to make an interference pattern stored in the optical storage media by ways of angle multiplexing or position multiplexing, thereby increasing the amount of data written into a disk per unit page. Furthermore, a motor of the holographic storage apparatus of the present disclosure can drive storing zones of the optical storage media to move with a greater distance, and then a plurality of the interference patterns can be produced at difference positions by a light interference module via the way of position multiplexing, thereby reducing power loss of the motor.

An aspect of the present disclosure provides a light interference module including an object lens, a first light-guiding element, and a second light-guiding element. The object lens is configured to project a signal light beam to an optical storage media. The first light-guiding element is configured to project a first reference light beam to the optical storage media, in which the first reference light beam and the signal light beam produce a first interference pattern on the optical storage media. The second light-guiding element is configured to project a second reference light beam to the optical storage media, in which the second reference light beam and the signal light beam produce a second interference pattern on the optical storage media, and the first interference pattern is different from the second interference pattern.

In some embodiments, the first light-guiding element and the second light-guiding element are disposed to surround the object lens.

In some embodiments, the light interference module further includes a first lens and a second lens. The first lens is disposed at a light outlet of the first light-guiding element, in which the first light-guiding element projects the first reference light beam to the optical storage media via the first lens. The second lens is disposed at a light outlet of the second light-guiding element, in which the second light-guiding element projects the second reference light beam to the optical storage media via the second lens.

In some embodiments, the first light-guiding element projects the first reference light beam along a first direction, and the second light-guiding element projects the second reference light beam along a second direction. The first direction is different from the second direction, and the first interference pattern and the second interference pattern partially overlap each other.

In some embodiments, the optical storage media has a plurality of storage layers, and the first interference pattern and the second interference pattern are respectively disposed in the different storage layers.

In some embodiments, each of the first light-guiding element and the second light-guiding element is a light-guiding tube.

An aspect of the present disclosure provides a holographic storage apparatus including a holographic light-emitting module, a spatial light modulator (SLM), and a light interference module. The holographic light-emitting module is configured to provide a signal light beam and a reference light beam. The SLM is configured to modulate the signal light beam and the reference light beam provided by the holographic light-emitting module. The light interference module includes an object lens, a first light-guiding element, and a second light-guiding element. The object lens is configured to receive signal light beam and project the signal light beam to an optical storage media. The first light-guiding element is configured to receive the reference light beam and project the reference light beam to the optical storage media, in which the signal light beam and the reference light beam projected by the first light-guiding element produce a first interference pattern on the optical storage media. The second light-guiding element is configured to receive the reference light beam and project the reference light beam to the optical storage media, in which the signal light beam and the reference light beam projected by the second light-guiding element produce a second interference pattern on the optical storage media.

In some embodiments, the holographic storage apparatus further includes a motor configured to change a relative position between the object lens and the optical storage media.

In some embodiments, the motor is connected to the optical storage media.

In some embodiments, the holographic light-emitting module includes a laser light source configured to provide the signal light beam and the reference light beam. The holographic storage apparatus further includes a polarizing beam splitter configured to receive the signal light beam and the reference light beam and to guide the signal light beam and the reference light beam which have the same polarization to the SLM.

In some embodiments, the holographic storage apparatus further includes a lens system receiving the signal light beam and the reference light beam propagated from the spatial light modulator. The lens system is configured to guide the signal light beam and the reference light beam to the object lens, the first light-guiding element, and the second light-guiding element.

In some embodiments, the holographic storage apparatus further includes an optical positioning unit configured to provide the optical storage media with a positioning light beam.

In some embodiments, the holographic storage apparatus further includes an optical loading unit configured to load data stored in the optical storage media.

In some embodiments, the holographic storage apparatus further includes a quarter-wavelength plate disposed in an optical path between the optical loading unit and the optical storage media.

An aspect of the present disclosure provides a light interference module including an object lens, light-guiding elements, and lens. The object lens is configured to project a signal light beam to an optical storage media. The light-guiding elements are disposed to surround the object lens. The lens are respectively disposed a light outlet of each of the light-guiding elements. The light-guiding elements project a plurality of reference light beams to the optical storage media along different directions via the lens, and the reference light beams and the signal light beam produce different interference patterns on the optical storage media.

DETAILED DESCRIPTION

Figure 1:
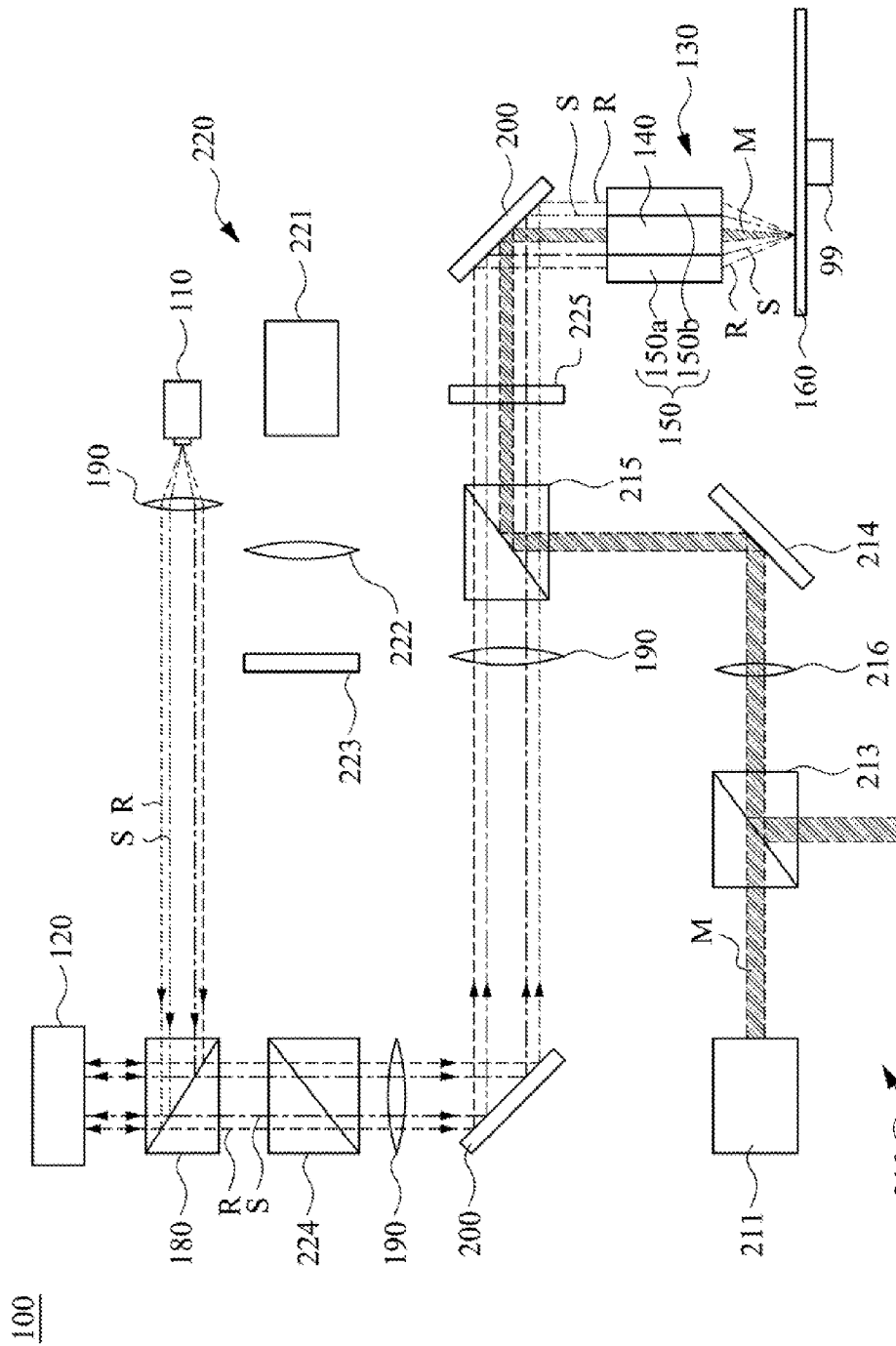
FIG. 1 is a schematic diagram of an arrangement of a holographic storage apparatus according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the present disclosure.

FIG. 1 is a schematic diagram of an arrangement of a holographic storage apparatus according to an embodiment of the present disclosure. A holographic storage apparatus 100 includes a holographic light-emitting module 110, a spatial light modulator (SLM) 120, and a light interference module 130. The light interference module 130 includes an object lens 140 and light-guiding elements 150. In order to make the descriptions succinct, two light-guiding elements are illustrated in FIG. 1 as a first light-guiding element 150a and a second light-guiding element 150b.

As shown in FIG. 1, the holographic light-emitting module 110 is configured to provide a signal light beam S and a reference light beam R. The SLM 120 is configured to modulate the signal light beam S and the reference light beam R provided by the holographic light-emitting module 110. The object lens 140 of the light interference module 130 is configured to receive signal light beam S and project the signal light beam S to an optical storage media 160. The first light-guiding element 150a and the second light-guiding element 150b of the light interference module 130 are configured to receive the reference light beam R and project the reference light beam R to the optical storage media 160.

The signal light beams S emitted by the SLM 120 has specific information. For example, the signal light beams S emitted by the SLM 120 can have a distribution with light and shade for representing signals of 0 and 1. The reference light beam R projected by the first light-guiding element 150a and the signal light beam S with the specific information are interfered on the optical storage media 160, and then a first interference pattern is produced on the optical storage media 160. The reference light beam R projected by the second light-guiding element 150b and the signal light beam S with the other specific information are interfered on the optical storage media 160, and then a second interference pattern is produced on the optical storage media 160. As shown in FIG. 1, since the reference light beam R projected by the first light-guiding element 150a and the reference light beam R projected by the second light-guiding element 150b are emitted toward the optical storage media 160 along the different directions, the first interference pattern and the second interference pattern are different from each other, thereby achieving a storage effect of angle multiplexing and increasing the storage capacity of the holographic storage technology.

Figure 2:
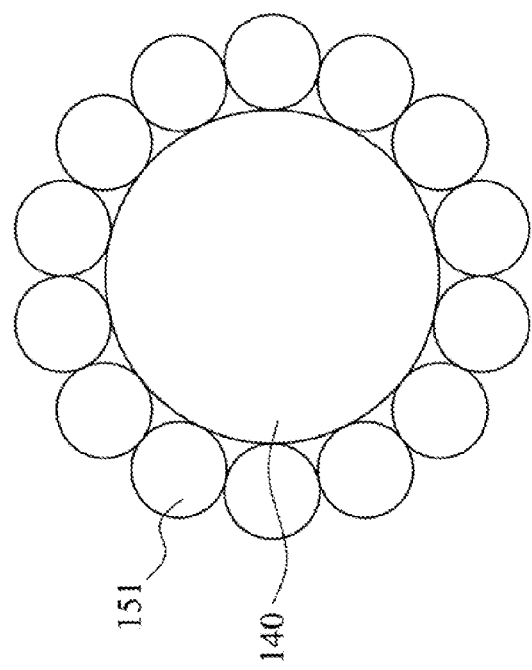
FIG. 2 is a top view of a light interference module according to an embodiment of the present disclosure.

FIG. 2 is a top view of a light interference module 130a according to an embodiment of the present disclosure. As shown in FIG. 2, the light interference module 130a includes a plurality of light-guiding elements 151, in which the light-guiding elements 151 are disposed to surround an object lens 140. In the present embodiment, the light-guiding elements 151 are disposed to surround the object lens 140 closely, but are not limited thereto. In the other embodiments, the light-guiding elements 151 are disposed to surround the object lens 140 by separating with a distance.

Figure 3:
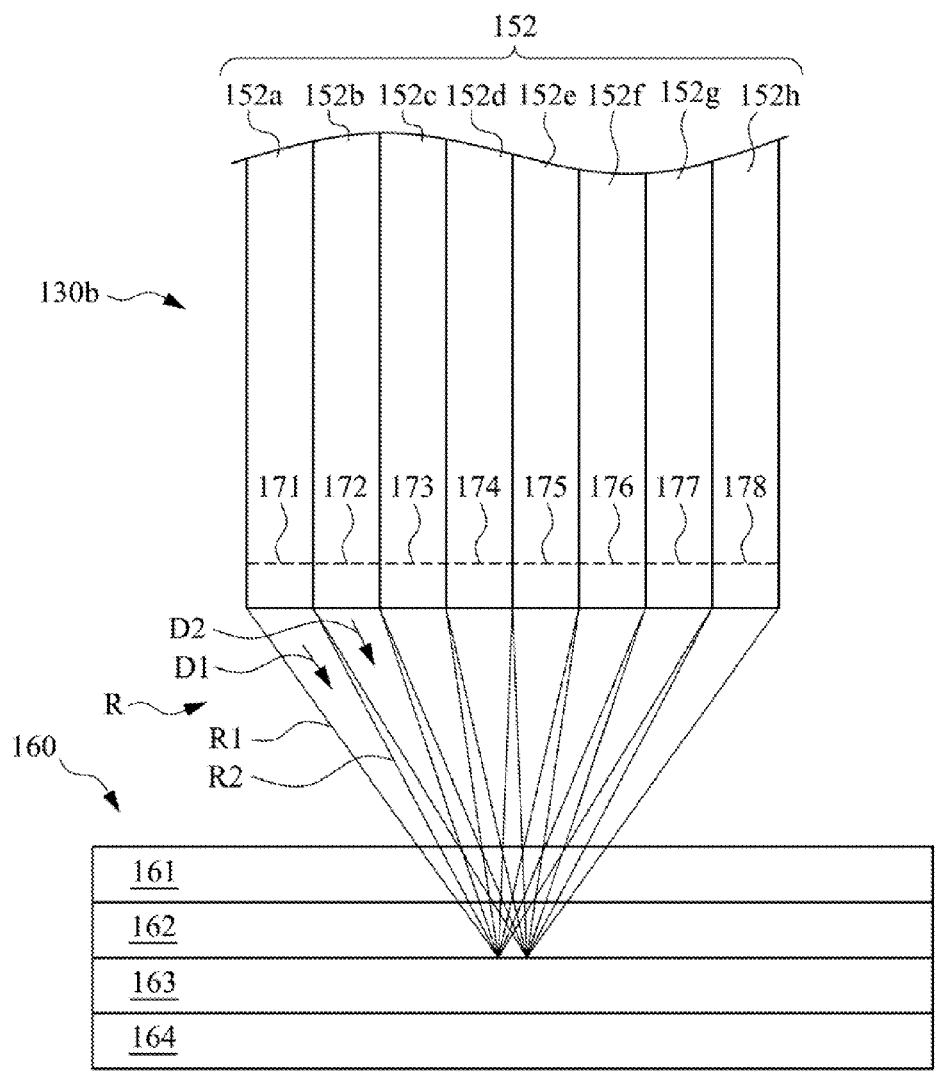
FIG. 3 is a schematic diagram that a light interference module projects reference light beams by a way of angle multiplexing according to an embodiment of the present disclosure.

FIG. 3 is a schematic diagram that a light interference module 130b projects reference light beams by a way of angle multiplexing according to an embodiment of the present disclosure. As shown in FIG. 3, a plurality of light-guiding elements 152 can be marked as a first light-guiding element 152a, a second light-guiding element 152b, a third light-guiding element 152c, a fourth light-guiding element 152d, a fifth light-guiding element 152e, a sixth light-guiding element 152f, a seventh light-guiding element 152g, and an eighth light-guiding element 152h. Since the first to the eighth light-guiding elements 152a-152h are disposed at the different positions, the reference light beams R can be respectively projected along eight directions toward an optical storage media 160.

For example, in the embodiment illustrated in FIG. 3, the first light-guiding element 150a can project a first reference light beam R1 along a first direction D1 toward the optical storage media 160, and the second light-guiding element 150b can project a second reference light beam R2 along a second direction D2 toward the optical storage media 160. Similarly, the third to eighth light-guiding elements 150c-150h are similar to the same as the first or second light-guiding element 150a or 150b. As shown in FIGS. 1 and 3, after the first reference light beam R1 and the signal light beam S with the specific information are interfered to produce a first interference pattern on the optical storage media 160, the second reference light beam R2 and the signal light beam S with the other specific information may be interfered to produce a second interference pattern on the optical storage media 160, in which the first interference pattern and the second interference pattern overlap each other at the same position of the optical storage media 160 in the embodiment illustrated in FIG. 3. Since the first reference light beam R1 and the second reference light beam R2 are emitted along the different directions (the first direction D1 and the second direction D2) toward the optical storage media 160, the storage effect of angle multiplexing is achieved such that the various interference patterns can be stored, thereby increasing the storage capacity of the holographic storage technology.

Furthermore, in the other embodiments, the various interference patterns can be stored in the optical storage media 160 by partially overlapping each other. That is, the various interference patterns may not be overlapped at the same position of the optical storage media 160. Therefore, the other modifications and variations of storing the various interference patterns by the light interference module 130b illustrated in FIG. 3 and the way of angle multiplexing are within the scope of the present disclosure.

Figure 4:
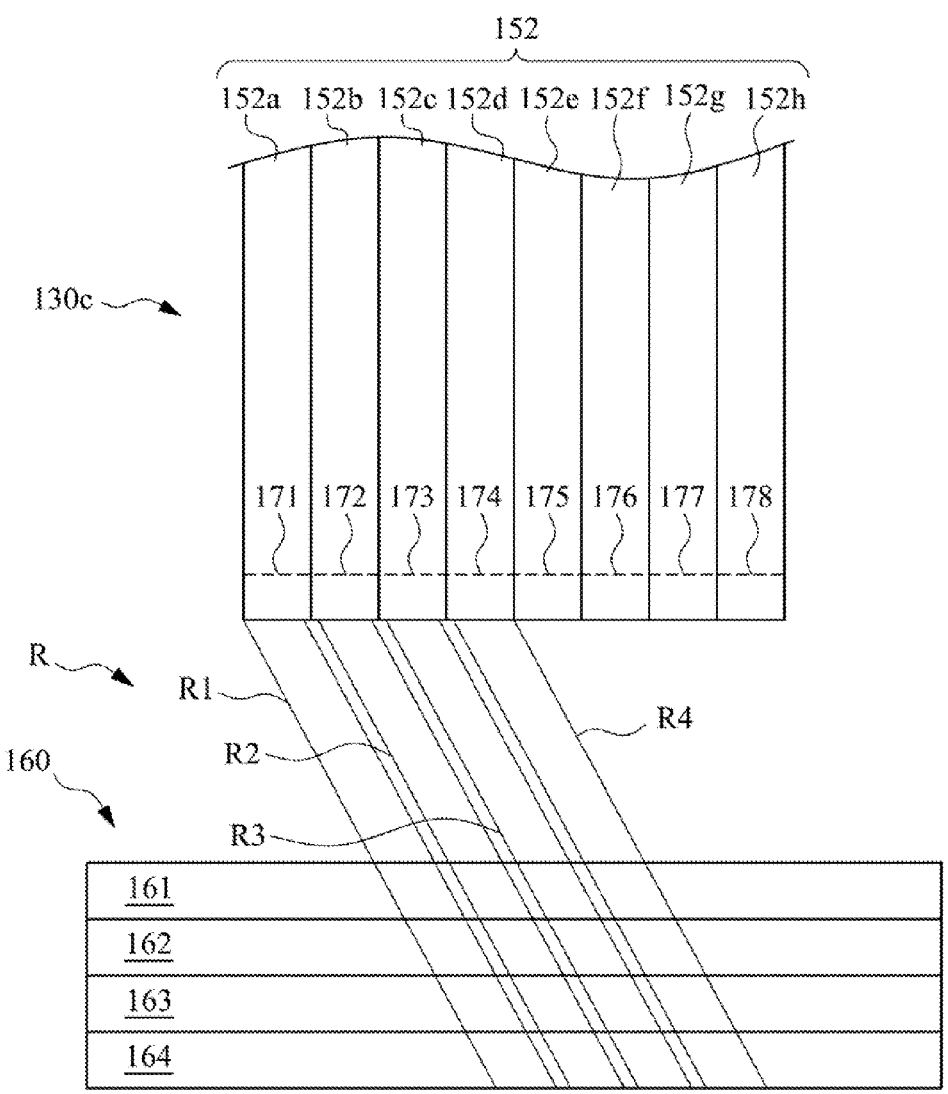
FIG. 4 is a schematic diagram that a light interference module projects reference light beams by a way of position multiplexing according to an embodiment of the present disclosure.

FIG. 4 is a schematic diagram that a light interference module 130c projects reference light beams by a way of position multiplexing according to an embodiment of the present disclosure. For making the descriptions succinct, only four reference light beams (thus, a first reference light beam R1, a second reference light beam R2, a reference light beam R3, and a fourth reference light beam R4) are illustrated in FIG. 4, and these four reference light beams R1-R4 are respectively projected toward the different positions of an optical storage media 160 by the a first to a fourth light-guiding elements 152a-152d. As shown in FIG. 4, the optical storage media 160 has a plurality of storage layers 161, 162, 163, and 164, and the first to the fourth reference light beams R1-R4 can be respectively projected to the different positions in the storage layer 164. As shown in FIGS. 1 and 4, the first to the fourth reference light beams R1-R4 can be respectively interfered with signal light beam with different information, such that various interference patterns can be respectively produced and stored in the different positions of the storage layer 164, thereby achieving the storing effect of position multiplexing.

Figure 5:
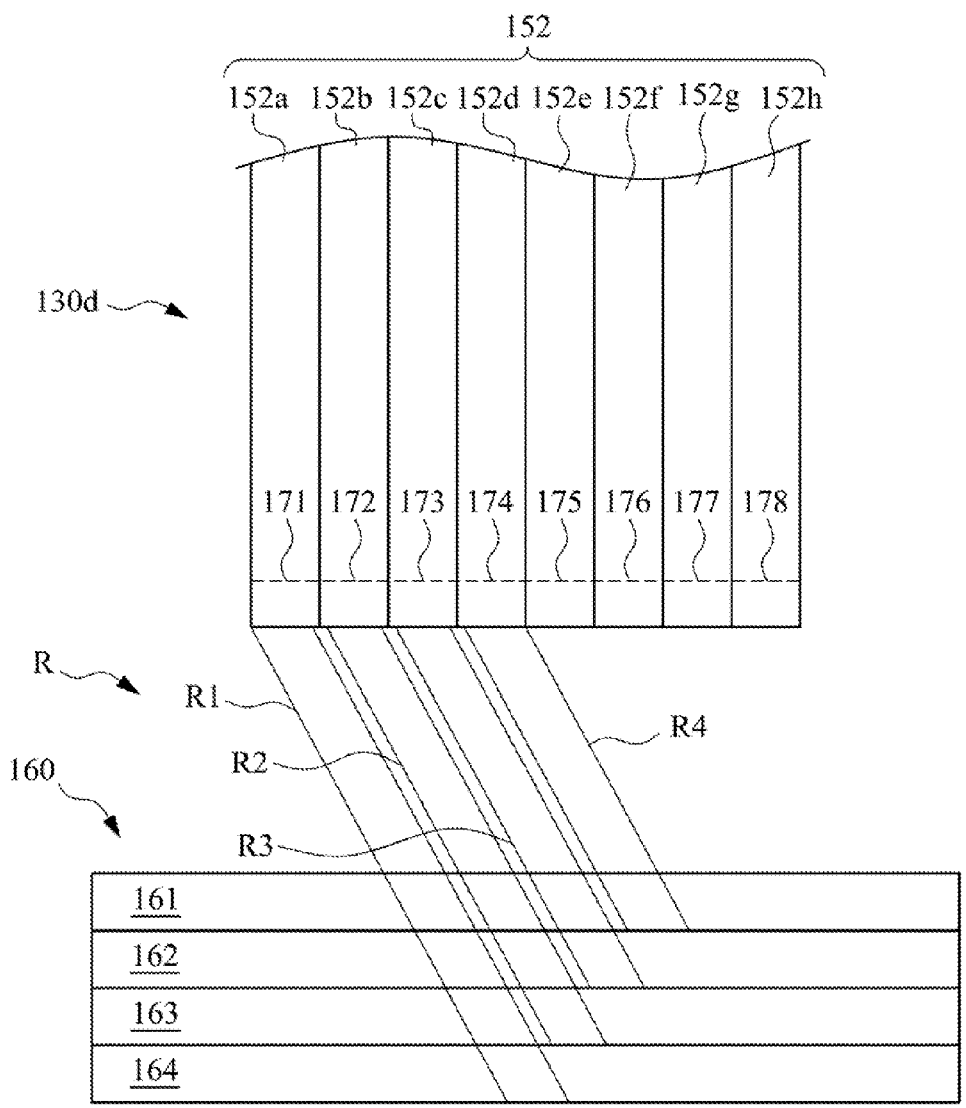
FIG. 5 is a schematic diagram that a light interference module projects reference light beams by a way of position multiplexing according to an embodiment of the present disclosure.

In addition to respectively projecting the different reference light beams to the different positions in the storage layer 164, in the other embodiments, the light interference module 130 can project the different reference light beams R to the optical storage media 160 with various depths. For example, FIG. 5 is a schematic diagram that a light interference module 130d projects reference light beams by a way of position multiplexing according to an embodiment of the present disclosure. As shown in FIG. 5, a first to a fourth reference light beams R1-R4 can be projected to an optical storage media 160 with various depths. The first to the fourth reference light beams R1-R4 are respectively projected to the optical storage media 160 with storage layers 161, 162, 163, and 164, such that various interference patterns can be respectively stored in the storage layers 161, 162, 163, and 164, thereby achieving the storing effect of position multiplexing.

In the some embodiments, the storing ways of position multiplexing illustrated in FIGS. 4 and 5 can be further varied to that a portion of the reference lights beams is projected to the different positions in the one storage layer and another portion of the reference lights beams is projected to the different positions in the another storage layer. By this configuration, the storing effect of position multiplexing also can be achieved. For example, as shown in FIG. 4, although the reference light beams R projected by the fifth to the eighth light-guiding elements 152e-152h are not illustrated in FIG. 4, it can be understood that the reference light beams R may be projected by the fifth to the eighth light-guiding elements 152e-152h to the other storage layer 161, 162 or 163 to achieve the storing effect of position multiplexing is achieved. Similarly, as shown in FIG. 5, it can be understood that the reference light beams R may be projected by the fifth to the eighth light-guiding elements 152e-152h to the positions, which are different from the first to the fourth reference light beams R, thereby achieving the storing effect of position multiplexing.

As shown in FIGS. 3 to 5, in some embodiments, the light interference module 130b, 130c or 130d further includes a plurality of lens, for example, a first lens 171, a second lens 172, a third lens 173, a fourth lens 174, a fifth lens 175, a sixth lens 176, a seven lens 177, and an eighth lens 178. Each of the first to the eighth lenses 171-178 may be a condenser lens, in which the first lens 171 is disposed at a light outlet of the first light-guiding element 152a, the second lens 172 is disposed at a light outlet of the second light-guiding element 152b, the third lens 173 is disposed at a light outlet of the third light-guiding element 152c, and the other lens are disposed similarly to the first to the third lenses 171-173. As shown in FIGS. 3 to 5, the first to the eighth light-guiding elements 152a-152h respectively project a plurality of the reference light beams R along the different directions via the first to the eighth lenses 171-178 toward the optical storage media 160, and the reference light beams R and the signal light beam S are respectively interfered to produce the various interference patterns on the optical storage media 160, thereby achieving the storing effect of position multiplexing or angle multiplexing.

Moreover, taking FIG. 5 as an example, the first lens 171 can have a predetermined angle configured to guide the first reference light beam R1 projected by the first light-guiding 150a to the optical storage media 160 with a predetermined depth (thus, guiding to the storage layer 164). Similarly, the second lens 172 can have another predetermined angle configured to guide the second reference light beam R2 projected by the second light-guiding 150b to the optical storage media 160 with another predetermined depth (thus, guiding to the storage layer 163). By this configuration, the reference light beams R can be projected to the optical storage media 160 with the same depth or the different depths by the lenses, thereby achieving the storing effect of angle multiplexing or position multiplexing.

In the above embodiments, each of the first to the eighth light-guiding elements 150a-150h can be a light-guiding tube, for example, a fiber or an element that can guide a light beam to a specific position. By guiding the reference light beams R to the specific positions by the first to the eighth light-guiding elements 150a-150h and projecting the reference light beams R to the optical storage media 160 with the specific depths, the reference light beams R and the signal light beam S can be respectively interfered to produce the various interference patterns on the optical storage media 160, thereby achieving the storing effect of position multiplexing or angle multiplexing.

Referring back to FIG. 1, the signal light beam S can be surrounded by the reference light beam R provided by the holographic light-emitting module 110. Therefore, when one of the light interference modules 130a, 130b, 130c, and 130d respectively illustrated in FIGS. 2 to 5 is applied to the holographic storage apparatus 100 in FIG. 1, the positions of the reference light beam R (formed by a plurality of the reference light beams as illustrated in FIGS. 2 to 5) and the positions of a plurality of the light-guiding elements 150 surrounding the object lens 140 can correspond to each other.

Figure 6:
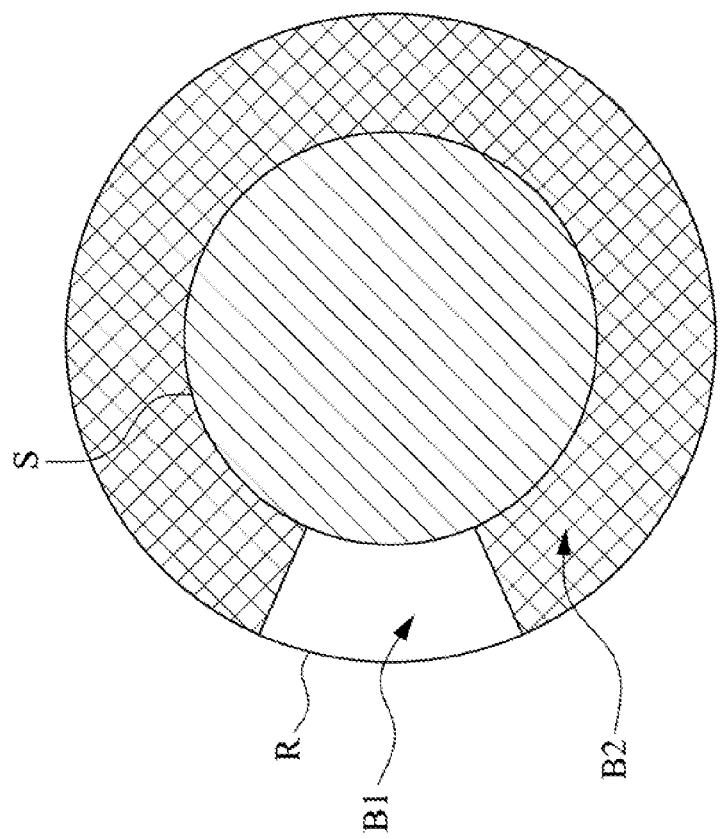
FIG. 6 is a schematic diagram of a reference light beam modulated by a spatial light modulator (SLM) according to an embodiment of the present disclosure.

FIG. 6 is a schematic diagram of a reference light beam modulated by a spatial light modulator 120 according to an embodiment of the present disclosure. As shown in FIGS. 1 and 6, after the reference light beam R are modulated by the SLM 120, the reference light beam R can have the distribution with light and shade. According to an embodiment, a light zone B1 in the reference light beam R can correspond to the position of the first light-guiding element 150a and a shade zone B2 in the reference light beam R can correspond to the positions of the other light-guiding elements, such that the light zone B1 in the reference light beam R can be projected to the optical storage media 160 via the first light-guiding element 150a to interfere with the signal light beam S with the specific information. Then, the distribution with light and shade of the reference light beam R can be changed by the SLM 120, and the signal light beam with the other information can be provided by the SLM 120. For example, the light zone B1 in the reference light beam R can be changed to correspond to the position of the second light-guiding element 150b by the SLM 120 and the shade zone B2 in the reference light beam R can be changed to correspond to the positions of the other light-guiding elements by the SLM 120, such that the light zone B1 in the reference light beam R can be projected to the optical storage media 160 via the second light-guiding element 150b to interfere with the signal light beam S with the other specific information, thereby achieving the storing effect of angle multiplexing or position multiplexing.

Referring back to FIG. 1, the holographic storage apparatus can further include a motor 99 connected to the optical storage media 160. The motor 99 can be configured to change a relative position between the object lens 140 and the optical storage media 160. That is, according to an embodiment, the optical storage media 160 may be a disk with photosensitive material, and the disk can be disk-shaped. The optical storage media 160 is driven to rotate by the motor 99, such that the interference patterns can be formed on the different storing zones of the optical storage media 160 by the light interference module 130.

In various embodiments of the present disclosure, since the light interference module 130 has the storing effect of position multiplexing (for example, as the light interference modules 130c and 130d), the load of the motor 99 can be reduced by the light interference module 130. In this configuration, the motor 99 can drive the optical storage media 160 to move with a greater distance, and then a plurality of the interference patterns corresponding to the reference light beam R and the signal light beam S can be produced at difference positions by the light interference module 130 via the way of position multiplexing, thereby reducing power loss of the motor 99.

In other words, the holographic storage apparatus 100 illustrated in FIG. 1 can determine the positions of the reference light beam R and the signal light beams S to be projected via the motor 99, and then the various interference patterns are formed on the different positions of the optical storage media 160 via the way of position multiplexing. Therefore, in addition to reduce the load and the loss of the motor 99, the holographic storage apparatus 100 can improve the position accuracy of the formed interference patterns.

In some embodiments of the present disclosure, the optical storage media 160 is not limited to be disk-shaped, and the shape of the optical storage media 160 can be a cuboid or other types. In addition, in some embodiments of the present disclosure, the motor 99 can be a step motor, for example, a displacement motor, a displacement motor utilizing piezoelectricity and a motor that can make a position changed.

Referring back to FIG. 1, the holographic light-emitting module 110 can be a laser light source, and the signal light beam S and the reference light beams R emitted by the holographic light-emitting module 110 are coherent to each other. Furthermore, according an embodiment, the holographic storage apparatus 100 further includes a polarizing beam splitter 180 configured to receive the signal light beam S and the reference light beam R. The polarizing beam splitter 180 is also configured to guide the signal light beam S and the reference light beam R which have the same polarization to the SLM 120. That is, the polarizing beam splitter 180 is configured to guide the signal light beam S and the reference light beam R with right circular-polarized light (S polarization) to SLM 120. After the signal light beam S and the reference light beam R are modulated by and reflected from the SLM 120, the signal light beam S and the reference light beam R become left circular-polarized light (P polarization), and then the signal light beam S and the reference light beam R can pass through the polarizing beam splitter 180.

As shown in FIG. 1, the holographic storage apparatus 100 can further include a lens system 190. The lens system 190 includes a plurality of lenses to receive the signal light beam S and the reference light beam R propagated from the SLM 120. In addition, the lens system 190 is configured to guide the signal light beam S to the object lens 140 and guide the reference light beam R to the light-guiding element 150. In FIG. 1, the holographic storage apparatus 100 can further include a plurality of reflective units 200. The reflective units 200 are disposed in optical paths of the signal light beam S and the reference light beam R, and configured to reflect the signal light beam S and the reference light beam R. However, a person having ordinary skill in the art may choose proper arrangements and the numbers of the lens system 190 and the reflective units 200, so as to guide the signal light beam S and the reference light beam R to the light interference module 130 effectively.

As shown in FIG. 1, the holographic storage apparatus 100 can further include an optical positioning unit 210 configured to provide the optical storage media 160 with a positioning light beam M. In FIG. 1, the optical positioning unit 210 can include a light emitter 211 and a light detector 212. The light emitter 211 is configured to provide the optical storage media 160 with the positioning light beam M, and the light detector 212 is configured to detect the positioning light beam M reflected from the optical storage media 160, so as to detect whether the optical storage media 160 is slanting and prevent the holographic storage apparatus 100 from being fail to write the data into the optical storage media 160.

As shown in FIG. 1, the optical positioning unit 210 can further include a first light splitter 213, a lens 216, a reflective unit 214, and a second light splitter 215. In FIG. 1, the positioning light beam M emitted by the light emitter 211 can pass through the first light splitter 213 and the lens 216. Then, the positioning light beam M is reflected from the reflective unit 214 and the second light splitter 215 and enters the object lens 140 of the holographic light-emitting module 130, and then the positioning light beam M is projected to the optical storage media 160 by the object lens 140. The positioning light beam M can be reflected from the optical storage media 160 into the original path in reverse, and then the positioning light beam M is reflected from the second light splitter 215 and the reflective unit 214 in sequence toward the lens 216. Then, the positioning light beam M is guided to the light detector 212 by the first light splitter 213, so as to detect whether the optical storage media 160 is slanting abnormally. The slanting optical storage media 160 may affect data writing or loading. In an application, a user can choose a proper arrangement or types of the first light splitter 213, the lens 216, the reflective unit 214, and the second light splitter 215 to achieve the optical positioning unit 210 described above. For example, according to an embodiment, the lens 216 can be a condenser lens, and the second light splitter 215 can be a dichroic beam separator (DBS).

Figure 7:
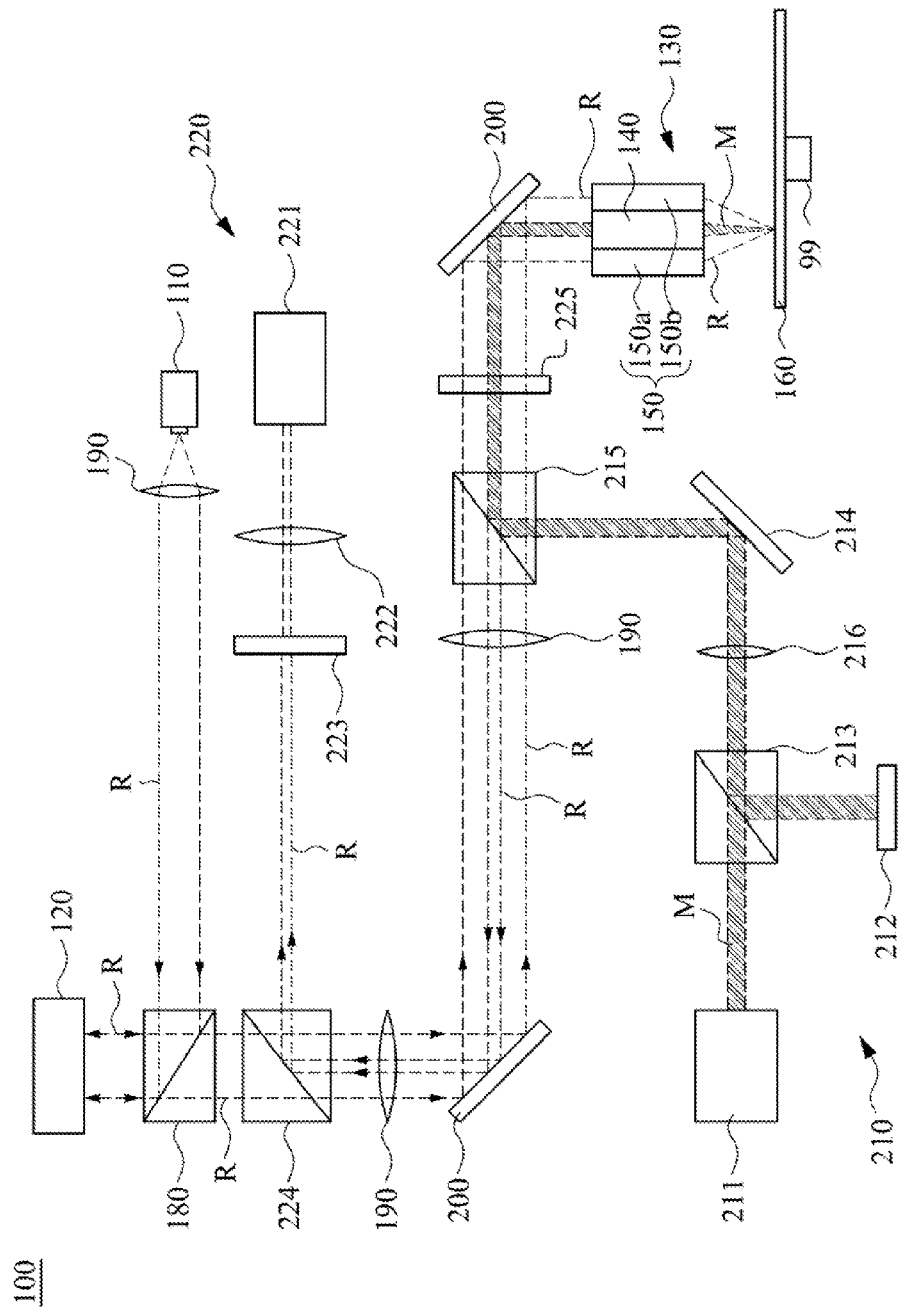
FIG. 7 is a schematic diagram that a holographic storage apparatus operates a loading operation according to an embodiment of the present disclosure.

FIG. 7 is a schematic diagram that a holographic storage apparatus operates a loading operation according to an embodiment of the present disclosure. As shown in FIG. 7, a holographic storage apparatus 100 further includes an optical loading 220 unit and a quarter-wavelength plate 225. The optical loading 220 can be configured to load data stored in the optical storage media 160. The quarter-wavelength plate 225 is disposed in an optical path between the optical loading unit 220 and the optical storage media 160.

Moreover, the optical loading unit 220 can further include a photosensitive element 221, a lens 222, an aperture 223, and a light beam splitter 224. During a loading operation of the holographic storage apparatus, a SLM 120 of the holographic storage apparatus 100 emits a reference light beam R along the same optical path as a writing operation, and the reference light beam R passes through the light beam splitter 224 and the quarter-wavelength plate 225. Then, after the reference light beam R is diffracted at the optical storage media 160, the reference light beam R is reflected from the optical storage media 160 to the object lens 140 since a reflective lens is disposed at the bottom of a disk having the optical storage media 160, and the reference light beam R passes through the quarter-wavelength plate 225 again. A phase difference between the reference light beam R passing through the quarter-wavelength plate 225 twice and the reference light beam R emitted by the holographic light-emitting module 110 is provided by 180 degrees. Therefore, when the reference light beam R enters the light beam splitter 224 again, the reference light beam R can be reflected form the light beam splitter 224 and pass through the aperture 223 and the lens 222, and then the reference light beam R can reach the photosensitive element 221 to be proceeded the data loading. According to an embodiment, the photosensitive element 221 can be a complementary metal-oxide-semiconductor (CMOS) or a charge-coupled device (CCD).

In sum, the holographic storage apparatus of the present disclosure includes the light interference module, in which the light interference module includes a plurality of the light-guiding elements disposed to surround the object lens. Therefore, the reference light beam can be projected to the same position or the different positions of the optical storage media by the light-guiding elements, so as to produce the various interference patterns with the signal light beam. By the light interference module of the present disclosure, the various interference patterns can be stored at the same position or be stored at the different positions in the optical storage media by the holographic storage apparatus, thereby achieving the storage effects of angle multiplexing or position multiplexing. Furthermore, the motor of the holographic storage apparatus of the present disclosure can drive the storing zones of the optical storage media to move with a greater distance, and then a plurality of the interference patterns can be produced at difference positions by the light interference module via the way of position multiplexing, thereby reducing power loss of the motor.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of present disclosure provided they fall within the scope of the following claims.

What is claimed is:

1. A light interference module, comprising:
   an object lens configured to project signal light beam to an optical storage media;
   a first light-guiding element configured to project a first reference light beam to the optical storage media, wherein the first reference light beam and the signal light beam produce a first interference pattern on the optical storage media; and
   a second light-guiding element configured to project a second reference light beam to the optical storage media, wherein the second reference light beam and the signal light beam produce a second interference pattern on the optical storage media, and the first interference pattern is different from the second interference pattern, wherein the first light-guiding element and the second light-guiding element are disposed to surround the object lens.

2. The light interference module of claim 1, further comprising:
   a first lens disposed at a light outlet of the first light-guiding element, wherein the first light-guiding element projects the first reference light beam to the optical storage media via the first lens; and
   a second lens disposed at a light outlet of the second light-guiding element, wherein the second light-guiding element projects the second reference light beam to the optical storage media via the second lens.

3. The light interference module of claim 1, wherein the first light-guiding element projects the first reference light beam along a first direction, the second light-guiding element projects the second reference light beam along a second direction, the first direction is different from the second direction, and the first interference pattern and the second interference pattern are partially overlapped each other.

4. The light interference module of claim 1, wherein the optical storage media has a plurality of storage layers, and the first interference pattern and the second interference pattern are respectively disposed in the different storage layers.

5. The light interference module of claim 1, wherein each of the first light-guiding element and the second light-guiding element is a light-guiding tube.

6. A holographic storage apparatus, comprising:
a holographic light-emitting module configured to provide a signal light beam and a reference light beam;
a spatial light modulator (SLM) configured to modulate the signal light beam and the reference light beam provided by the holographic light-emitting module; and
a light interference module, comprising:
an object lens configured to receive signal light beam and project the signal light beam to an optical storage media;
a first light-guiding element configured to receive the reference light beam and project the reference light beam to the optical storage media, wherein the signal light beam and the reference light beam projected by the first light-guiding element produce a first interference pattern on the optical storage media; and
a second light-guiding element configured to receive the reference light beam and project the reference light beam to the optical storage media, wherein the signal light beam and the reference light beam projected by the second light-guiding element produce a second interference pattern on the optical storage media, wherein the signal light beam is surrounded by the reference light beam, and the first light-guiding element and the second light-guiding element are disposed to surround the object lens.

7. The holographic storage apparatus of claim 6, further comprising:
a first lens disposed at a light outlet of the first light-guiding element, wherein the first light-guiding element projects the reference light beam to the optical storage media via the first lens; and
a second lens disposed at a light outlet of the second light-guiding element, wherein the second light-guiding element projects the reference light beam to the optical storage media via the second lens.

8. The holographic storage apparatus of claim 6, wherein the first light-guiding element projects the reference light beam along a first direction, the second light-guiding element projects the reference light beam along a second direction, the first direction is different from the second direction, and the first interference pattern and the second interference pattern are partially overlapped each other.

9. The holographic storage apparatus of claim 6, wherein the optical storage media has a plurality of storage layers, and the first interference pattern and the second interference pattern are respectively disposed in the different storage layers.

10. The holographic storage apparatus of claim 6, wherein each of the first light-guiding element and the second light-guiding element is a light-guiding tube.

11. The holographic storage apparatus of claim 6, further comprising:
a motor configured to change a relative position between the object lens and the optical storage media.

12. The holographic storage apparatus of claim 11, wherein the motor is connected to the optical storage media.

13. The holographic storage apparatus of claim 6, wherein the holographic light-emitting module comprises a laser light source configured to provide the signal light beam and the reference light beam, and the holographic storage apparatus further comprises a polarizing beam splitter configured to receive the signal light beam and the reference light beam and to guide the signal light beam and the reference light beam which have the same polarization to the spatial light modulator.

14. The holographic storage apparatus of claim 6, further comprising:
a lens system receiving the signal light beam and the reference light beam propagated from the spatial light modulator, wherein the lens system is configured to guide the signal light beam and the reference light beam to the object lens, the first light-guiding element, and the second light-guiding element.

15. The holographic storage apparatus of claim 6, further comprising an optical positioning unit configured to provide the optical storage media with a positioning light beam.

16. The holographic storage apparatus of claim 6, further comprising an optical loading unit configured to load data stored in the optical storage media.

17. The holographic storage apparatus of claim 16, further comprising a quarter-wavelength plate disposed in an optical path between the optical loading unit and the optical storage media.

18. A light interference module, comprising:
an object lens configured to project a signal light beam to an optical storage media;
a plurality of light-guiding elements disposed to surround the object lens; and
a plurality of lens respectively disposed a light outlet of each of the light-guiding elements, wherein the light-guiding elements project a plurality of reference light beams to the optical storage media along different directions via the lens, and the reference light beams and the signal light beam produce different interference patterns on the optical storage media.

* * * * *